United States Patent
Kim

(10) Patent No.: US 7,668,439 B2
(45) Date of Patent: Feb. 23, 2010

(54) APPARATUS FOR REPRODUCING DATA, METHOD THEREOF AND RECORDING MEDIUM

(75) Inventor: Kun Suk Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 784 days.

(21) Appl. No.: 11/325,457

(22) Filed: Jan. 5, 2006

(65) Prior Publication Data

US 2006/0156010 A1  Jul. 13, 2006

Related U.S. Application Data

(60) Provisional application No. 60/641,779, filed on Jan. 7, 2005.

(30) Foreign Application Priority Data

Dec. 7, 2005  (KR) ............... 10-2005-0118682

(51) Int. Cl.
  *H04N 7/00* (2006.01)
  *H04N 5/00* (2006.01)
(52) U.S. Cl. .................... 386/95; 386/125
(58) Field of Classification Search ............... 386/95, 386/94, 46, 125, 124
  See application file for complete search history.

(56) References Cited

U.S. PATENT DOCUMENTS

| | | | |
|---|---|---|---|
| 6,510,516 | B1 | 1/2003 | Benson et al. |
| 2001/0056533 | A1* | 12/2001 | Yianilos et al. ............ 713/153 |
| 2003/0114144 | A1 | 6/2003 | Minemura |
| 2003/0152366 | A1 | 8/2003 | Kanazawa et al. |
| 2004/0101285 | A1 | 5/2004 | Seo et al. |
| 2008/0205859 | A1* | 8/2008 | Ikeda et al. ............ 386/124 |

FOREIGN PATENT DOCUMENTS

| | | |
|---|---|---|
| CN | 1287639 | 3/2001 |
| EP | 1 198 133 | 4/2002 |
| EP | 1 422 620 | 5/2004 |
| JP | 2003 224560 A | 8/2003 |
| JP | 2004 103239 A | 4/2004 |
| WO | WO 99/36854 | 7/1999 |
| WO | WO 2004/025651 | 3/2004 |
| WO | WO 2004 064314 A1 | 7/2004 |

OTHER PUBLICATIONS

"Java Security, The Default Sandbox," XP-002286453, pp. 18-21, May 2001.
Search Report for European Application No. 06700231.1 dated Nov. 18, 2008.
International Search Report dated Sep. 29, 2006.
Office Action for Chinese patent application No. 200680001843.7 dated Jul. 3, 2009.

* cited by examiner

*Primary Examiner*—Robert Chevalier
(74) *Attorney, Agent, or Firm*—Harness, Dickey & Pierce

(57) ABSTRACT

An apparatus for reproducing data, method thereof and recording medium are disclosed. In reproducing a title configured with data within a recording medium and/or data within a local storage, a method of reproducing data, the present invention includes the steps of checking information of identifying an application associated with the title from an object file corresponding to the title, authenticating the associated application, and reproducing the title by executing the application. Accordingly, the present invention can protect contents provided by a content provider and a user's playback system. Hence, the content provider can provide contents safely and the user can reproduce the contents with security. Therefore, the present invention can provide more convenient functions.

20 Claims, 12 Drawing Sheets

APPARATUS FOR REPRODUCING DATA, METHOD THEREOF AND RECORDING MEDIUM

This application claims the benefit of the U.S. Provisional Application No. 60/641,779, filed on Jan. 7, 2005, in the name of inventor Kun Suk KIM entitled "SECURITY AND CONTENT PROTECTION METHOD OF BLU-RAY DISC", which is hereby incorporated by reference as if fully set forth herein.

This application claims the benefit of the Korean Patent Application No. 10-2005-0118682, filed on Dec. 7, 2005, which is hereby incorporated by reference as if fully set forth herein.

BACKGROUND OF THE INVENTION

1. Field of the Invention

The present invention relates to reproduction of data within a recording medium and/or a local storage, and more particularly, to an apparatus for reproducing data, method thereof and recording medium.

2. Discussion of the Related Art

Generally, optical discs capable of recording large-scale data as record media are widely used. Recently, a new high-density recording medium, e.g., Blu-ray disc (hereinafter abbreviated BD) has been developed to store video data of high image quality and audio data of high sound quality for long duration.

The BD as a next generation recording medium technology is a next generation optical record solution provided with data remarkably surpassing that of a conventional DVD. And, many efforts are made to research and develop the BD together with other digital devices.

The optical recording/reproducing device should be provided with a basic function of recording and reproducing a Blu-ray disc (BD) and additional functions considering convergence with peripheral digital devices. Hence, it is expected that the optical recording/reproducing device should be provided with a general function of receiving to display an external input signal and a function of reproducing a BD together with the external input signal.

An optical recording/reproducing device with the application of the Blu-ray Disc specifications starts to be developed. Yet, due to the incomplete Blu-ray disc specifications, the complete development of the optical recording/reproducing device has many difficulties.

In particular, since a preferable method of protecting contents provided by a content provider and a user's playback system has not been proposed or developed, many limitations are put on the development of a full-scale BD based optical recording/reproducing device.

SUMMARY OF THE INVENTION

Accordingly, the present invention is directed to an apparatus for reproducing data, method thereof and recording medium that substantially obviate one or more problems due to limitations and disadvantages of the related art.

An object of the present invention is to provide an apparatus for reproducing data, method thereof and recording medium, by which contents provided by an authentic content provider and a user's playback system can be protected.

Another object of the present invention is to provide an apparatus for reproducing data, method thereof and recording medium, in which an application is authenticated to be executed and by which contents and a payback system can be protected.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in reproducing a title configured with data within a recording medium and/or data within a local storage, a method of reproducing data according to the present invention includes the steps of checking information of identifying an application associated with the title from an object file corresponding to the title, authenticating the associated application, and reproducing the title by executing the application.

For example, the application is authenticated through an authentication of a file configuring the application.

For example, the file is a JAR file.

For example, the authentication of the file comprises verification of a digital signature of an entity signing the application using a signature block file with the file.

For example, the verification is performed using a public key within the signature block file.

For example, the public key corresponds to a private key used for a generation of the digital signature.

For example, the verification comprises verifying certificates of a certificate chain, and wherein the certificate chain is included within the signature block file.

For example, the authentication of the file comprises checking integrity of a manifest file within the file using a signature file within the file.

For example, the authentication of the file comprises checking integrity for actual data of the file using a manifest file within the file.

For example, the authenticating is performed on Java virtual machine.

For example, in case that the authenticating fails, the application is not executed.

For example, in case that the authenticating fails, the application is executed within a sandbox on Java virtual machine.

For example, the information is an application management table (AMT).

In another aspect of the present invention, a recording medium includes a data area on which contents are recorded and a management area for managing a reproduction of the contents, wherein a title configured with at least one or more signed applications is recorded in the data area, wherein an object file including information of identifying an application associated with the title is recorded in the management area, and wherein the signed application includes a signature file and a signature block file.

For example, the signature file includes a digest of a manifest file for the file configuring the signed application.

For example, the digest of the manifest file is computed by applying the manifest file to SHA 1 digest algorithm.

For example, the signature block file includes a digital signature of an entity signing the application.

For example, the digital signature is generated by encrypting the digest of the signature file with a private key of the entity through signature algorithm.

For example, the signature algorithm is an RSA.

In a further aspect of the present invention, in reproducing a title configured with data within a record medium and/or data within a local storage, an apparatus for reproducing data includes a controller checking information for identifying an application associated with the title from an object file corresponding to the title, the controller authenticating the associated application, and a decoder reproducing the title according to an execution of the application.

For example, the controller authenticates the application in a manner of authenticating a file while data of the file is being loaded to Java virtual machine.

For example, the authenticating comprises verification of a digital signature of an entity signing the file using a signature block file with the file.

For example, the verification is performed using a public key within the signature block file.

For example, the public key corresponds to a private key used for a generation of the digital signature.

For example, the authenticating comprises checking integrity of a manifest file within the file using a signature file within the file.

For example, in case that the authenticating fails, the controller controls the application not to be executed.

For example, in case that the authenticating fails, the controller controls the application to be executed within a sandbox on Java virtual machine.

By the present invention, contents can be safely provided and data can be efficiently reproduced. Hence, the present invention provides convenient functions to a user.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

First of all, for convenience of explanation, the present invention takes an optical disc, and more particularly, "Blu-ray disc (BD)" as an example of a recording medium. Yet, it is apparent that the technical idea of the present invention is identically applicable to other record media.

Figure 1:
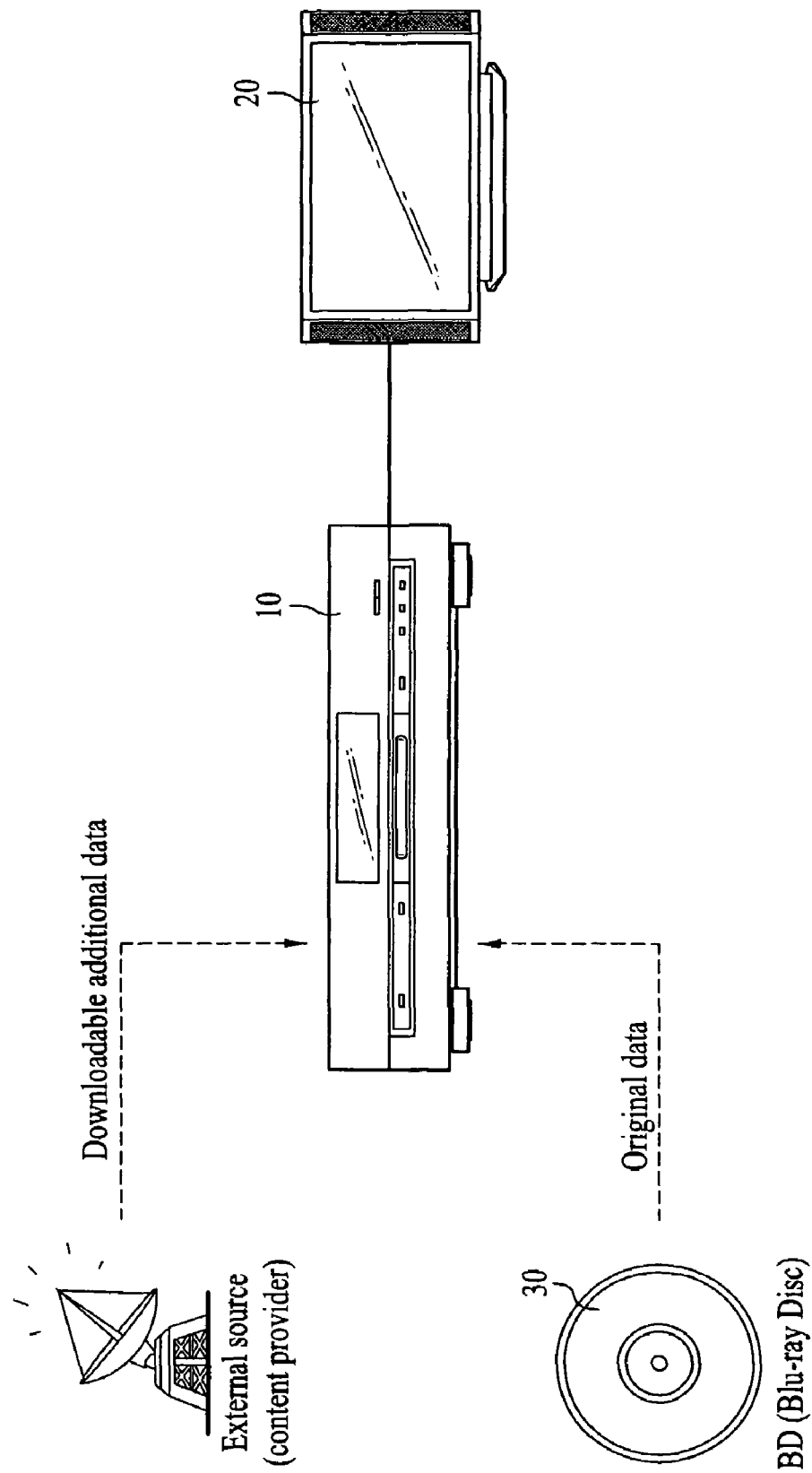
FIG. 1 is an exemplary diagram for explaining a unified use between an optical recording/reproducing device and peripheral devices to facilitate conceptional understanding of the present invention.

In the present invention, "local storage" is a sort of a storage means provided within an optical recording/reproducing device shown in FIG. 1 and means an element in which a user can randomly store necessary information and data to utilize. In particular, the local storage, which is currently used in general, includes "hard disc", "system memory", "flash memory" or the like, which does not put limitation on the scope of the present invention.

Specifically, the "local storage" is utilized as a means for storing data associated with a recording medium (e.g., Blu-ray disc). The data associated with the recording medium to be stored within the local storage generally includes data downloaded from outside.

Besides, it is apparent that a permitted data directly read out of a recording medium in part or a generated system data (e.g., metadata, etc.) associated with record reproduction of the recording medium can be stored within the local storage.

For convenience of explanation of the present invention, the data recorded within the recording medium shall be named "original data" and the data associated with the recording medium among the data stored within the local storage shall be named "additional data".

In the present invention, "title" is a reproduction unit configuring an interface with a user. Each title is linked to a specific object file. And, a stream associated with the corresponding title recorded within a disc is reproduced according to a command or program within the object file. In particular, for explanation convenience of the present invention, a title having moving picture, movie and interactive information according to MPEG2 compression among titles recorded within a disc shall be named "HDMV Title". And, a title having moving picture, movie and interactive information executed by a Java program among titles recorded within a disc shall be named "BD-J Title".

In the present invention, the title also means an indexing item existing in an index table. Namely, "First Playback", which has information of an initially reproduced image once a recording medium is loaded, or "Top Menu", which provides a menu image is a sort of the title. Namely, a reproduction unit configuring an interface with a user corresponds to a title of the present invention regardless of its name.

And, the title is characterized in being configured with data within a recording medium and/or a local storage. The data within the local storage can include data that is downloaded while the title is being reproduced.

FIG. 1 is an exemplary diagram for explaining a unified use between an optical recording/reproducing device 10 and peripheral devices to facilitate conceptional understanding of the present invention.

Referring to FIG. 1, "optical recording/reproducing device" 10 according to the present invention enables a record or reproduction of an optical disc according to versatile specifications. And, the optical recording/reproducing device 10 can be designed to record/reproduce an optical disc (e.g., BD) of a specific specification. Moreover, the optical recording/reproducing device 10 can be made to reproduce an optical disc only. In the following description of the present invention, by considering interactivity between a Blu-ray disc (BD) and a peripheral device, a BD-player or a BD-recorder will be taken as an example. And, it is apparent that the "optical recording/reproducing device" 10 includes "drive" loadable within a computer or the like.

The optical recording/reproducing device 10 according to the present invention is equipped with a function of recording/reproducing an optical disc 30 and a function of receiving an external input signal, performing signal-processing on the received signal, and delivering a corresponding image to a user via another external display 20. In this case, no limitation is put on the external input signal. And, a DMB (digital multimedia broadcast) signal, an Internet signal or the like can be a representative one of the external input signals. In case of Internet as an easily accessible medium, a specific data on Internet can be downloaded via the optical recording/reproducing device 10 to be utilized.

Besides, a party, who provides contents, as an external source is generically named "content provider (CP)".

In the present invention, contents, which configure a title, mean data provided by a recording medium author.

Specifically, the object of the present invention is to protect the contents provided by the content provider and to protect a user's playback system.

The original data and the additional data will be explained in detail as follows. For instance, if a multiplexed AV stream for a specific title is recorded as an original data recorded within an optical disc and if an audio stream (e.g., English) different from the audio stream (e.g., Korean) of the original data is provided as an additional data on Internet, a request for downloading the audio stream (e.g., English) as the additional data on Internet to reproduce together with the AV stream of the original data or a request for downloading the audio stream (e.g., English) as the additional data on Internet to reproduce only will exist according to a user. To enable the requests, association between the original data and the additional data needs to be regulated and a systematic method of managing/reproducing the data according to the user's request is needed.

For convenience of explanation in the above description, a signal existing outside the disc is named additional data, which is identified according to a method of acquiring each data but does not put limitation on restricting the original or additional data to a specific data.

Hence, the additional data generally includes audio, presentation graphic (PG), interactive graphic (IG), text subtitle or the like, on which limitation is not put. And, the additional data can correspond to a multiplexed AV stream including all of the illustrated data and video. Namely, data having any kind of attribute, which exists outside the optical disc and is associated with the original data, can become the additional data.

Moreover, the additional data can be individually downloaded per index file (index), PlayList file (*.m2ts) or clip information file (*.clpi). Besides, the additional data can be downloaded by contents unit or by title unit.

To realize the user's requests, it is essential to provide a file structure between the original data and the additional data. File and data record structures usable for a Blu-ray disc (BD) are explained in detail with reference to FIG. 2 and FIG. 3 as follows.

Figure 2:
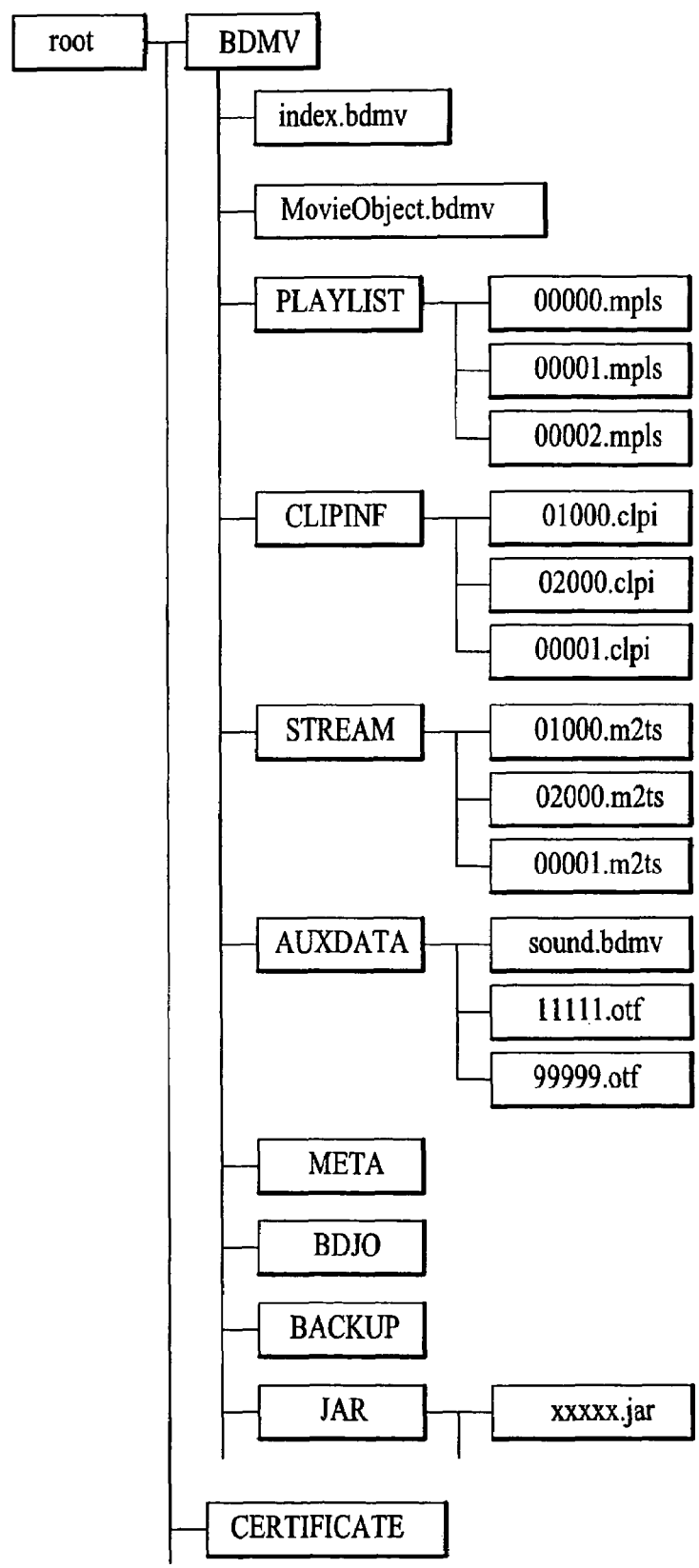
FIG. 2 is a diagram of a file structure recorded within a recording medium according to the present invention such as a BD-ROM.

FIG. 2 is a diagram of a file structure recorded within a recording medium according to the present invention.

Referring to FIG. 2, in a reproduction management file structure according to the present invention, at least one BDMV directory exists below one root directory. An index file ("index.bdmv") and an object file ("MovieObject.bdmv") as general file (higher file) information to secure interactivity with a user exist within the BDMV directory. And, the BDMV directory, which has information of data actually recorded within a disc and information about reproducing the recorded data information, is provided with PLAYLIST directory, CLIPINF directory, STREAM directory, BDJO directory including a BD-J Object file, and JAR directory including a JAR file. And, the BDMV directory is also provided with AUXDATA directory including auxiliary data associated with disc reproduction. The directories and files included in each of the directories are explained in detail as follows.

In STREAM directory, AV stream files recorded within a disc in a specific format exist and use ".m2ts" as an extension of a stream file (01000.m2ts, . . . ). In particular, moving picture data is generally recorded as contents associated with the present invention within the stream file.

CLIPINF directory includes clip information files (01000.clpi, . . . ) corresponding to the stream files, respectively. In particular, the clip information file (*.clpi) includes attribute information and timing information of the corresponding stream file. In particular, the clip information file (*.clpi) corresponding to the stream file (*.m2ts) by one-to-one are bound together to be named "clip". Namely, this means that a clip information file (*.clpi) must exist for one corresponding stream file (*.m2ts).

PLAYLIST directory includes PlayList files (00000.mpls, . . . ). Each of the PlayList files (00000.mpls, . . . ) includes at least one PlayItem designating a reproducing time of a specific clip. The PlayItem has information about reproduction start time (IN-Time) and reproduction end time (OUT-Time) of a clip designated as a clip name (clip_Information_File_name) within a specific clip, i.e., PlayItem to be reproduced.

Namely, the PlayList file (*.mpls) becomes a basic management file unit within an entire management file structure, which performs a reproduction of a specific clip by a combination of at least one or more PlayItems.

In particular, the PlayList file (*.mpls) can be operated by a command given by a specific object file. Hence, in viewpoint of a disc playback scenario, the object file performs or manages a dynamic scenario and the PlayList file (*.mpls) performs or manages a static scenario.

BDJO directory includes a BD-J Object file for reproducing a BD-J Title.

JAR directory contains all "xxxxx.jar" files for BD-J. A JAR (Java archive) file is a compressed file used in distributing a plurality of file collections. The JAR file is generally configured with a java classes file associated with a specific java program, auxiliary resources, metadata and the like. Various applications can be configured by the JAR file.

AUXDATA directory includes files containing auxiliary information associated with disc playback. For instance, AUXDATA directory can include a sound file ("Sound.bdmv") providing click sound and menu sound information and the like in playback and font files ("11111.otf") providing font information in reproducing a text subtitle.

META directory is provided with metadata. The metadata is the data about a data. And, the metadata includes a search file, a file for Disc Library and the like.

Positions of the above explained files and directories are exemplary. And, it is apparent that the positions can be varied if necessary. For instance, a BDJO directory and JAR directory as subdirectories can be separately configured below the root directory. For another instance, JAR directory can be configured as a higher directory below the root directory.

Moreover, the root directory can include a directory containing information about protection of data recorded within the recording medium or data downloaded to the local storage. This is represented as CERTIFICATE directory of the embodiment shown in FIG. 2. The root certificate file used for authentication of application and binding unit authentication is placed in the CERTIFICATE directory.

Figure 3:
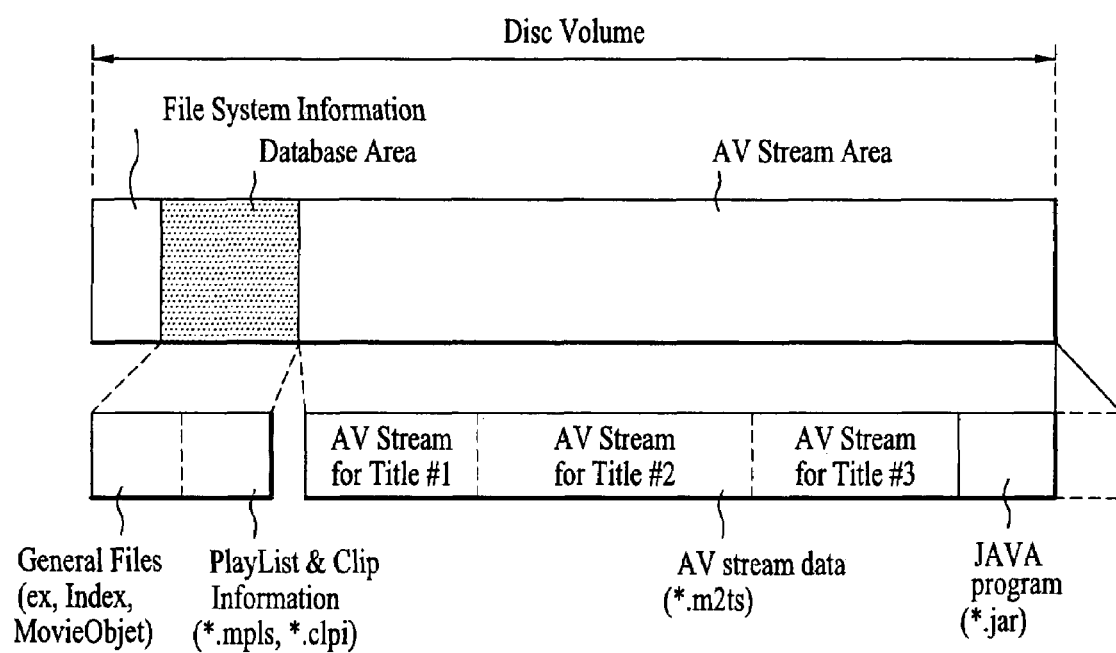
FIG. 3 is a diagram of a data record structure written on an optical disc according to the present invention.

FIG. 3 is a diagram of a data record structure written on an optical disc according to the present invention, in which a format of recording information associated with the aforesaid file structure within a disc is shown.

Referring to FIG. 3, in view from an inner circumference of a disc, there exist a file system information area as system information for managing an entire file, an area ("database area") in which index file, object file, PlayList file, clip information file and metadata file are written to reproduce a recorded stream (*.m2ts) are recorded, and a stream or data area in which a stream configured with audio/video/graphic and the like or a JAR file is recorded.

An area for recording file information for reproducing contents within the data area and the like is named a management area. And, the file system information area and the database area correspond to the management area. Yet, each of the areas shown in FIG. 3 is exemplarily proposed. Hence, it is apparent that the present invention is not limited to the arranged structure of the respective areas shown in FIG. 3.

Figure 4:
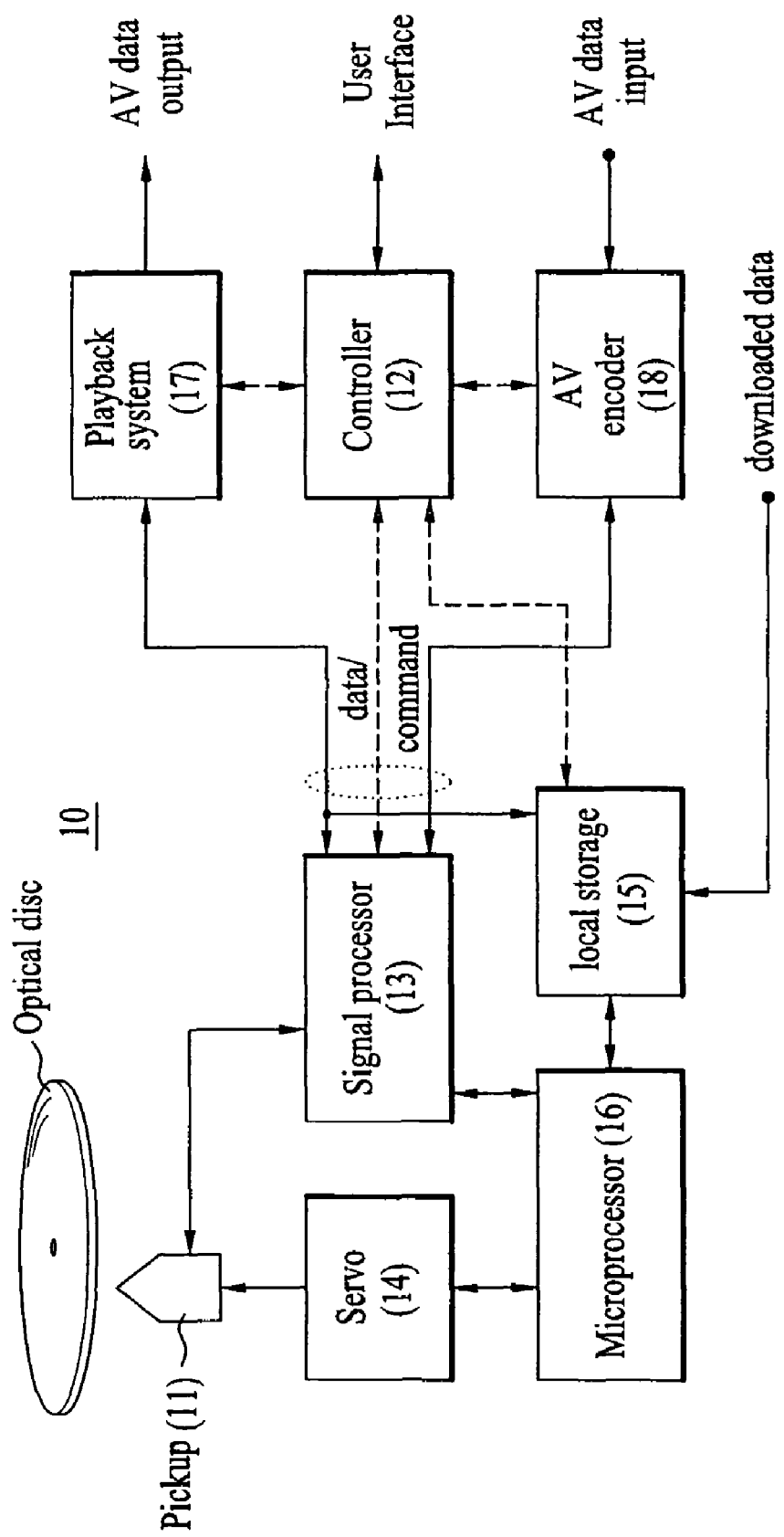
FIG. 4 is a block diagram of an optical recording/reproducing device according to one embodiment of the present invention.

FIG. 4 is a block diagram of an optical recording/reproducing device according to one embodiment of the present invention.

Referring to FIG. 4, an optical recording/reproducing device according to one embodiment of the present invention basically includes a pickup 11 for reproducing management information including original data and reproduction management file information recorded in an optical disc, a servo 14 controlling an action of the pickup 11, a signal processor 13 restoring a reproduction signal received from the pickup 11 to a specific signal value, modulating a signal to be recorded into a signal recordable on the optical disc, and delivering the modulated signal, and a microprocessor 16 controlling the overall operations.

Additional data existing on a place except an optical disc is downloaded to a local storage 15 by a controller 12. The controller 12 generates a binding unit using information recorded in a binding unit manifest file within the local storage 15. The controller 12 generates a virtual package to reproduce recording medium data and data within the local storage 15 using name mapping information recorded in the binding unit manifest. The controller 12 reproduces original data and/or additional data according to a user's request by utilizing the generated virtual package.

Besides, the virtual package is generated via a binding operation performed by a virtual file system and becomes a file structure for reproducing and managing an original clip configured with original data stored in a different area within a disc and an additional clip configured with additional data within the local storage 15.

The binding unit manifest file includes information used for a binding operation for generating the virtual package. Without the binding unit manifest file, the virtual package cannot be generated from binding the data within the local storage 15 with the file structure (disc package) within the recording medium.

The name mapping information, which is recorded in the binding unit manifest file, indicates where the data recorded within the recording medium is located in the virtual package.

The newly generated virtual package can be stored in the local storage 15 for later reuse or temporarily stored in a separate dynamic memory to be utilized.

In the present invention, the controller 12 authenticates whether an application to be executed is defective and then executes the application. Through this, it is able to disable an application distributed by an unauthorized entity to access contents provided by an authentic content provider. Furthermore, it is able to protect a user's playback system 17 against a malicious function of the application. The authentication of the application will be explained in the description of FIG. 5 in detail.

A playback system 17 finally decodes output data according to provide to a user under the control of the controller 12. The playback system 17 includes a decoder decoding an AV signal and a player model deciding a reproduction direction by analyzing an object file command or application associated with the aforesaid reproduction of a specific title and a user command inputted via the controller 12. And, the playback system 17 will be explained in detail in the description of FIG. 5.

In order to record a signal in the optical disc, an AV encoder 18 converts an input signal to a signal of a specific format, e.g., an MPEG2 transport stream according to a control of the controller 12 and then provides the converted signal to the signal processor 13.

Figure 5:
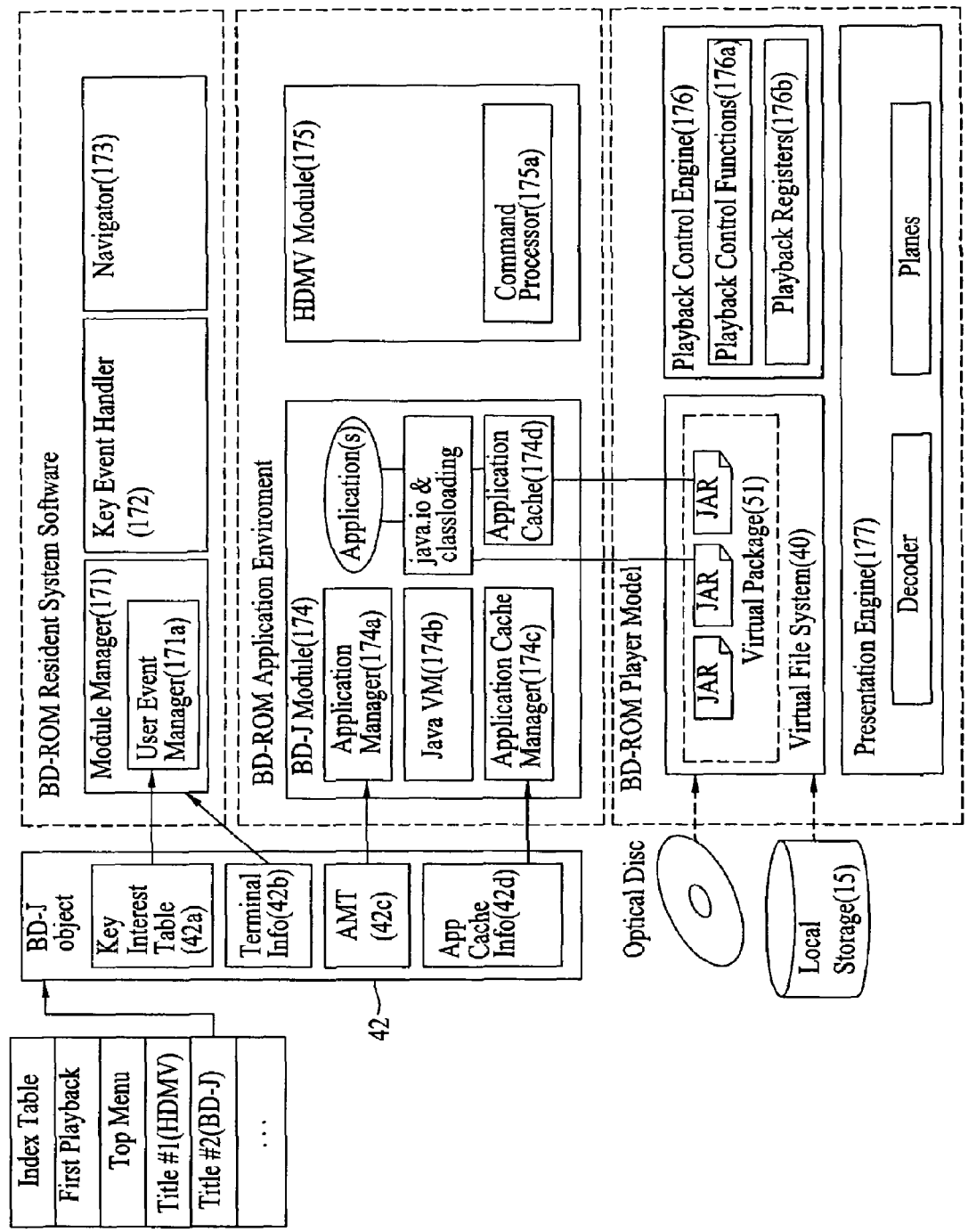
FIG. 5 is a block diagram of a data reproducing apparatus utilizing a playback system according to one embodiment of the present invention.

FIG. 5 is a block diagram of a data reproducing apparatus utilizing a playback system according to one embodiment of the present invention.

First of all, "playback system" includes a collective reproduction processing means constructed with a program (software) and/or hardware provided within the optical recording/reproducing device. The playback system plays a recording medium loaded in the optical recording/reproducing device and simultaneously reproduces and manages the data that is associated with the recording medium and is stored in the local storage (e.g., data downloaded from outside).

Referring to FIG. 5, once a recording medium is loaded, a virtual file system 40, binds original data recorded in the recording medium and additional data of a local storage together and then generates a virtual package 51. Yet, if a binding unit corresponding to the loaded recording medium does not exist in the local storage, the virtual file system 40 can generate the virtual package 51 using a disc package within the recording medium.

The virtual file system 40 provides a binding operation of the virtual package and controls an access mechanism to a file belonging to the virtual package 51. The generation of the virtual package 51 performed by the virtual file system 40 is defined by a binding unit manifest file. The binding unit manifest file includes management information of the binding operation and provides a valid combination of files bound into the virtual package together.

The virtual package 51 generated by the virtual file system 40 is used in both BD-J and HDMV modes. In the BD-J mode, an application located at the recording medium or local storage can access the virtual package 51 via the virtual file system 40. In the HDMV mode, MovieObject can access the virtual package.

Once a recording medium is loaded, an index table is provided to a user. The index table provides the user with indexing items by the virtual package. In particular, in case that the virtual package is generated using the disc package within the recording medium only, an index table within the recording medium is provided to the user. In case that the virtual package is generated from binding the data within the recording medium and the data within the local storage together, an index table enabling a reproduction of the binding result is provided to a user.

If a reproduction command for a HDMV title among indexing items of the index table is given, a corresponding PlayList file is executed according to a command provided within MovieObject of a management file structure. Thereafter, according to PlayList file information, at least one clip configuring the title is reproduced by a specific PlayItem and/or SubPlayItem.

The present invention relates to a reproduction of a title and has a target of a title including at least one application. The title corresponding to a reproduction unit for reproducing data of a recording medium and/or local storage can include A/V data associated with the application. Yet, the title can simply reproduce the A/V data without including the application. For instance, autostart PlayList can be executed without an associated application. Likewise, it is not mandatory for a title to include a presentation of A/V data. For instance, a title configured with at least one application can exist like a game.

In reproducing a title including at least one or more applications, the present invention is characterized in protecting data of a recording medium and data of a local storage by authenticating the application associated with the title and by reproducing the title.

In the following description, a BD-J Title among titles including applications is taken as an example. A reproduction of the BD-J Title is explained with reference to FIG. 5 as follows.

First of all, a BD-J title has one associated BD-J Object 42. Each BD-J Object is stored in a separate "xxxxx.bdjo" file. A BD-J Object contains management information associated BD-J title. Upon selection of a BD-J title, the associated BD-J Object becomes valid. As the management information, there are "KeyInterestTable (42a)", "TerminalInfo (42b)", "AMT (42c)", "AppCacheInfo (42d)" and the like.

Once a reproduction command of a BD-J title in the indexing table is given, "Module manager (171)" sends BD-J Object ID corresponding to the BD-J title to "BD-J Module (174)" to activate the BD-J title. The "BD-J Module (174)" loads a BD-J Object corresponding to the received BD-J Object ID. "Application Management Table (AMT, 42c)" within the BD-J Object is sent to "Application Manager (174a)" by the "BD-J Module (174)" and "Application Cache Information (APPCacheInfo, 42d)" is sent to "Application Cache Manager (174c)". Moreover, "BD-J Module (174)" loads "KeyInterestTable (42a)" in "User Event manager (171a)" and loads "terminal Information (TerminalInfo, 42b)" in the "Module Manager (171)".

"Application Management Table (AMT, 42c)" identifies the applications associated with a title and provides comprehensive information about each of the applications such as lifecycle-, parameterization-, profile & version-, and user-comprehensive information. If the "Application Management Table (AMT, 42c)" is loaded in the "Application Manager (174a)", the "Application Manager (174a)" executes an auto-run application signaled in the "Application Management Table (AMT, 42c)".

Besides, an application is an abbreviation of an application program and means a program designed, which means a program designed to enable a specific function to be directly performed. The application is executed by "Java VM (virtual machine) (174b)". The application officially requests or communicates with another program using an API (application program interface).

The application manages a network function within an optical recording/reproducing device such as an operation of downloading additional data from outside of a recording medium. And, the application can manage the local storage 15. for instance, the application generates a virtual package in a manner of editing files stored in the local storage 15 or binding the files with a disc package. Namely, a specific function is performed within a playback system by the application.

Various applications can be configured by a JAR file. The JAR (Java archive) is a compressed file used in distributing a plurality of file collections. As mentioned in the foregoing description of FIG. 2, a java classes file associated with a specific program, auxiliary resources, metadata and the like are stored in the JAR file in general.

An application may exist within a recording medium or within a local storage. Namely, JAR files configuring a specific application may exist in a recording medium or a local storage. In case that a JAR file exists in a local storage, the JAR file can be downloaded from outside of a recording medium. It is a matter of course that the JAR file can be read out of a loaded recording medium as well.

In order to execute an application associated with BD-J title to be reproduced, data such as classes performing the application and the like are loaded in "Java VM" from a JAR file of the virtual package 51 by the "Application Manager (174(a))". "Application Manager (174a)" can load applications from Application Cache (174d).

The purpose of the Application Cache (173c) is to guarantee seamless playback of AV data from the disc during application loading and to reduce latency in loading data. Namely, the Application Cache (173c) is the preload buffer for BD-J. Yet, a player can use additional data, which includes class files, which is not preloaded. One example of this is the loading of data from JAR files in a local storage. And, "APPCacheInfo (42d)" decides what files should be transferred to the "Application Cache (174d)" from a virtual package.

In the present invention, while data is loaded from JAR files configuring an application, "Java VM (174b)" authenticates the JAR files. A configuration and authentication of a JAR file configuring an application will be explained in detail with reference to FIGS. 6 to 11.

Once a JAR file configuring an application according to the present invention is authenticated, the application is executed to reproduce BD-J Title. Initially, application(s) represented as auto-start in "AMT (42c)" is initially executed. By the application(s), another applications associated with the Title can be executed.

According to the execution of the application, "Playback Control Engine (176)" interprets PlayList file information existing in a disc or local storage substantially and then executes a corresponding PlayList with reference to "Player Registers (176(b))" storing a reproduction environment and state of a player. Clips reproduced by the execution of the PlayList are provided to "Presentation Engine (177)" and are then decoded into one of video, audio, graphic and text subtitle according to a stream type. The decoded stream will be displayed to a user via planes.

The "Playback Control Engine (176)" includes "Playback Control functions (176a)" actually managing all reproductions and "Player Registers (176b)" storing player status registers (PSR) and general purpose register (GPR). In some cases, "Playback Control functions (176a)" may mean "Playback Control Engine (176)".

In the playback system 17 of the present invention, the "Module Manager (171)", "HDMV Module (175)", "BD-J Module (174)" and "Playback Control Engine (176)" are designed as software, respectively. Substantially, software is more advantageous than a hardware configuration in design. Yet, the "Presentation Engine (177)", decoder and planes are normally designed by hardware. In particular, the elements (e.g., reference numbers 171, 174, 175, 176) processed by software can be configured with a portion of the controller 12 described in FIG. 4. Hence, the configuration of the present invention should be understood by its meaning but is not limited to a hardware configuration or a software configuration.

The playback system 17 according to the present invention has the following features.

First of all, "HDMV Module (175)" for HDMV Title and "BD-J Module (174)" for BD-J Title are independently configured. And, both of the modules 174 and 175 are not simultaneously executed. Namely, BD-J Title cannot be reproduced while HDMV Title is being reproduced, and vice versa.

Secondly, HDMV Title and BD-J Title receive user commands of separate types, respectively and execute user commands independent from each other, respectively. "Key Event Handler (172)" receives a user command to deliver to one of "HDMV Module (175)", "BD-J Module (174)" and "Module Manager (171)/Navigator (173)". For instance, if a received command is a user command by "User Operation (UO)", "Key Event Handler (172)" transfers the command to "Module Manager (172)". If a received command is a user command by "Key Event", "Key Event Handler (172)" transfers the command to "BD-J Module (174)".

Thirdly, a management, which can be called "master", of the aforesaid "Playback control Engine (176)" is taken charge of by one of the currently operating modules 174 and 175. Namely, "HDMV Module (174)" becomes a master while HDMV title is being reproduced. "BD-J Module (174)" becomes a master while BD-J title is being reproduced.

Besides, "Navigator (173)" is made to perform a title selection under the control of a user at anytime and can provide a recording medium and title metadata to a user.

Figure 6:
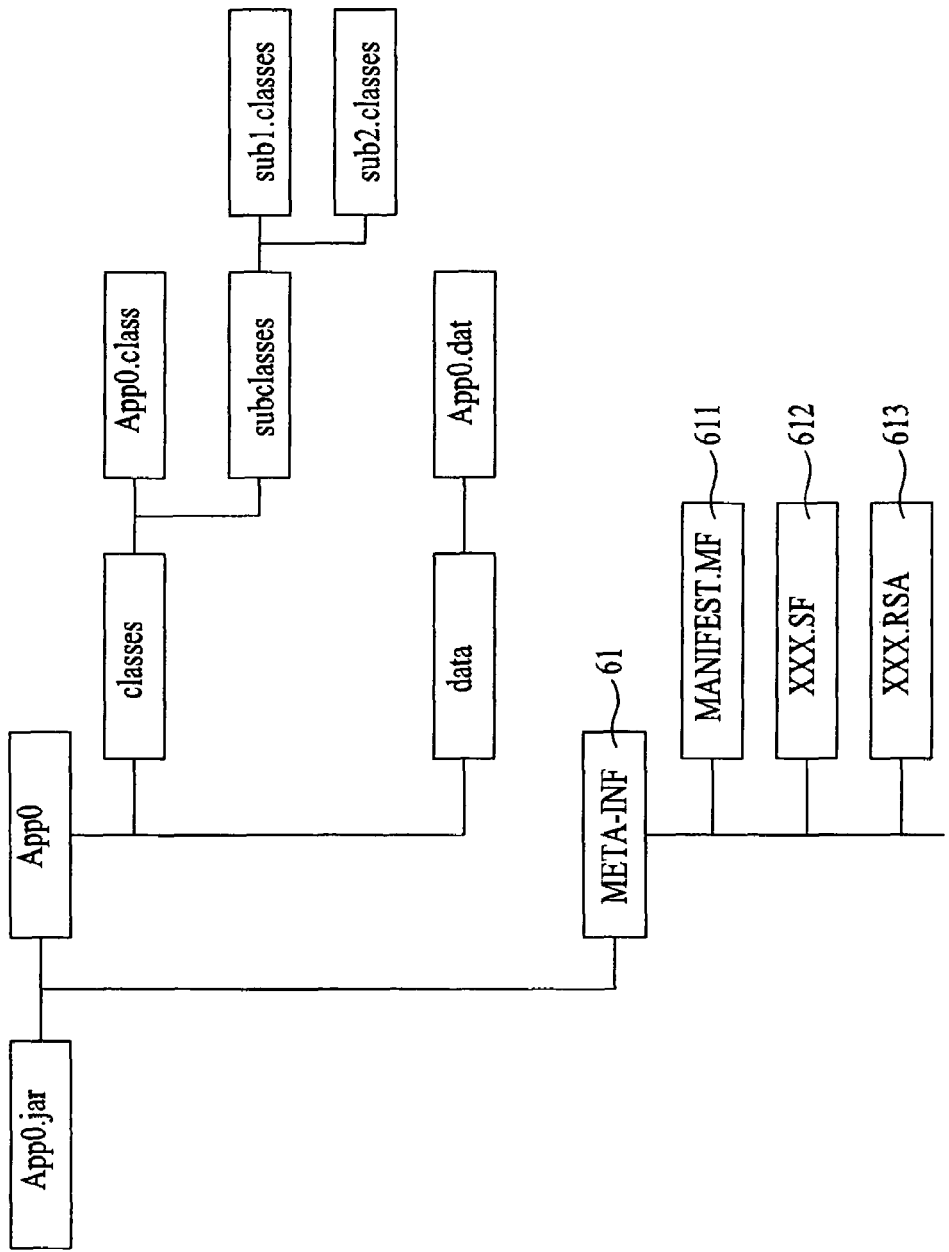
FIG. 6 is a diagram of a JAR file configuring a signed application according to one embodiment of the present invention.

FIG. 6 is a diagram of a JAR file configuring a signed application according to one embodiment of the present invention.

Referring to FIG. 6, a JAR file as a sort of a compressed file is used in collecting a plurality of files into one. If the JAR file is signed, the JAR file is called a signed JAR file. And, an application configured with the signed JAR file is called a signed application. The signed JAR file is equivalent to an original JAR file except that a manifest file is updated and that a signature file and a signature block file are added to METAINFO directory.

Files used for authentication of data are called authentication messages. In the present invention, it is preferable that the authentication message is included in a JAR file. As long as being executed as JAR files, authentication of an application according to the present invention is enabled regardless whether the application exists on a disc or is obtained via network.

An application of FIG. 6 is a signed application. A JAR file configuring the application includes "APP0" file and METAINFO directory 61. "APP0" file includes "classes" file and a data directory. "APP0.dat" exists in the data directory. The "classes" file includes "APP0.class" file and "subclasses" directory. "sub1.class" and "sub2.class" exist in the "subclasses" directory. Once an execution command for the application configured with the JAR file is given, classes within the JAR file are loaded.

The METINFO directory 61 includes a manifest file (MANIFEST.MF) 611 and a signature block (XXX.RSA) 613. By the files, authentication of the application is achieved. The file name "XXX" indicates an entity having signed the JAR file. And, the file name "XXX" can be called a signature alias of a content provider. The manifest file, the signature file and the signature block file are the authentication messages used for the authentication of the application according to the present invention. The authentication messages are explained in detail as follows.

The manifest file 611 contains a listing of the files in a JAR file along with a message digest for each file signed. Besides, not all files in the JAR file need to be listed in the manifest file 611 as entries, but all files which are to be signed should be listed. Hence, in an embodiment of FIG. 6, in case that all class files (APP1.class, sub1.class, sub2.class) within the JAR file are signed, entries for "APP0.clas" file, "sub1.class" file and "sub2.class" file should be listed in the manifest file 611.

The signature file 612 contains the digest of the manifest file. The signature file will be the data signed by an authorizing organization. After a message digest has been computed using contents of the signature file 612, a digital signature is generated by encrypting the computed result via signature algorithm using a private key. Namely, the digital signature can be a signed version of a signature file. The generated digital signature is placed within the signature block file 613. Each signature file may have multiple digital signatures, but those signatures should be generated by the same legal entity.

Besides, the private key is a private key corresponding to a public key existing in the signature block file 613. And, the public key is placed in one of leaf certificates of certificates within the signature block file 613.

The signature block file 613 contains one or more certificate chains used for signature verification. The signature block file 613 can be called a digital signature file. The digital signature file has the same file name of the signature file 612 but differs in extension. The extension is determined by signature algorithm. For instance, the extension corresponds to ".RSA", ".DSA" or the like.

Figure 7:
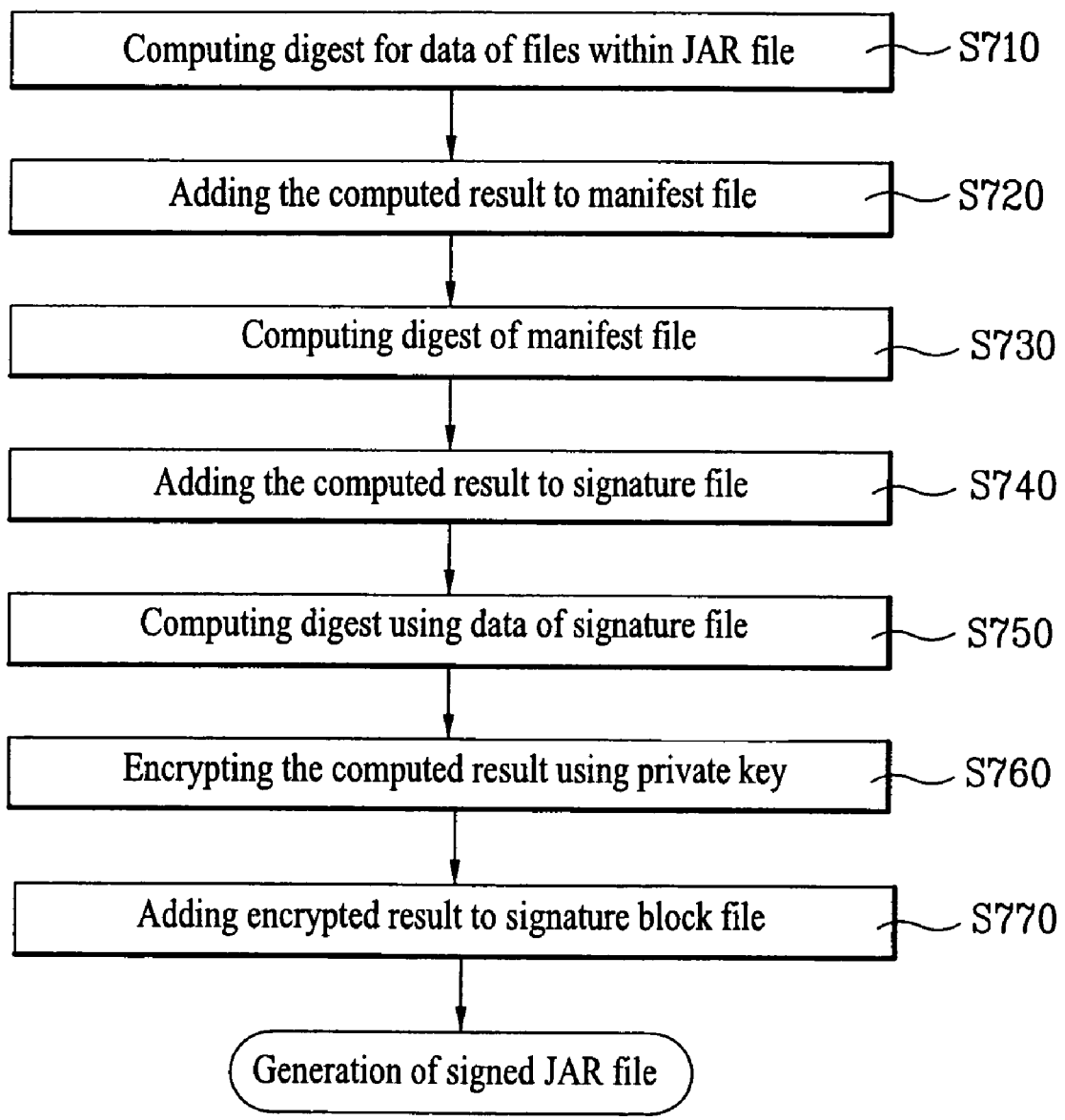
FIG. 7 is a flowchart of configuration of a signed JAR file according to one embodiment of the present invention.

FIG. 7 is a flowchart of configuration of a signed JAR file according to one embodiment of the present invention.

Referring to FIG. 7, first of all, digest for data of files included within a JAR file is computed (S710). A manifest file is generated and the computed result is stored in the manifest file (S720). The digest of files included in the JAR file is used in proving that an application provided to a user are not changed.

Besides, the digest is computed by a digest algorithm. The digest algorithm means an algorithm for finding a hash having a predetermined length corresponding to each data after completion of a hashing process of data. The computed digest, which is mapped to corresponding data by one-to-one correspondence, can be utilized as a code that can prove contents of information. Namely, if data is computed into digest via digest algorithm, integrity of data such as correction, sequence change, deletion, addition and the like can be checked using the corresponding digest.

The digest algorithm receives data having a random length and then computes a result having a uniform length. In particular, the digest algorithm used for the present invention is a unidirectional hash function. Hence, since it is unable to estimate original data from the computed digest, the digest algorithm is suitable for a recording medium according to the present invention. As the digest algorithm, SHA 1 (secure hash algorith-1), MD5 (message digest algorithm 5) or the like can be used.

A digest of the manifest file including the digest of the files included within the JAR file is computed (S730). A signature file is generated to store the digest of the manifest file (S740). In this case, the signature file is used in guaranteeing the integrity of the manifest file.

The signature file is signed using a content provider's private key that provides the JAR file. Namely, after the digest has been computed using data of the signature file (S750), a result of the digest computation of the signature file is encrypted using the private key (S760). The encrypted result is added to the signature block file with a certificate (S770).

Besides, the encrypted result of the signature file becomes a digital signature. A signature algorithm is used for the generation of the digital signature. The signature algorithm is a sort of an encryption algorithm. For example, RSA (Rivest-Shamir-Adelman), DSA (digital signature algorithm) or the like can be used as the encryption algorithm. The generation of the digital signature will be explained in detail with reference to FIG. 8.

A provided of the application generates a signed JAR file by binding the generated manifest, the signature file and the signature block file together and then provides the signed JAR file to a user.

Figure 8:
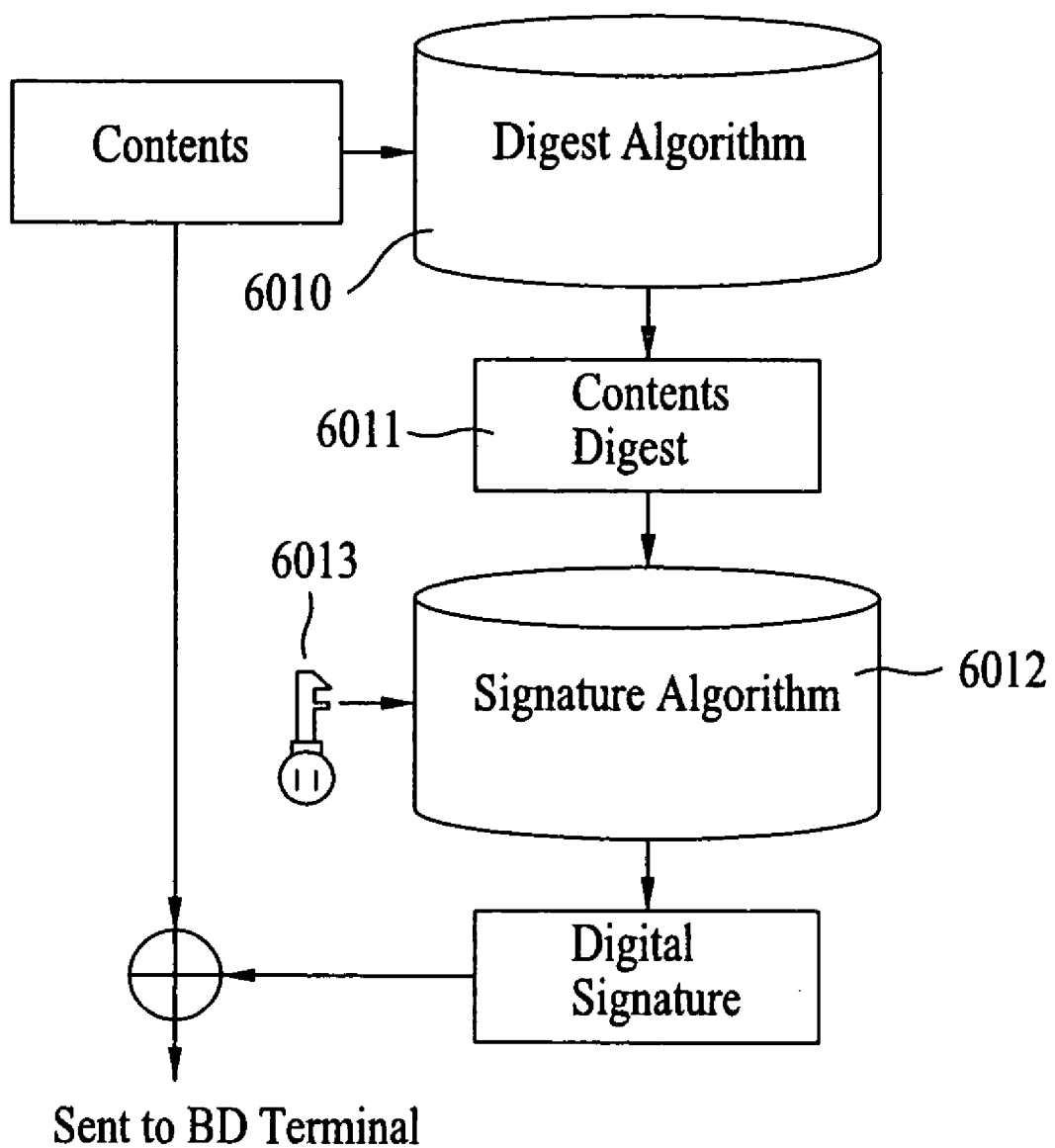
FIG. 8 is a diagram of a process for configuring a digital signature according to one embodiment of the present invention.

FIG. 8 is a diagram of a process for configuring a digital signature according to one embodiment of the present invention.

Referring to FIG. 8, a content provider, who provides an application, signs a JAR file to guarantee authenticity of the application provided to a user and then provides the signed JAR file to the user. A digital signature is used in checking whether the application is provided by an authentic entity. And, the digital signature is used in preventing the application from being forged in the process of providing the application. An entity having a secret key can make a signature and has to prove that the signature is made by the entity himself. And, the signed application cannot be changed.

Data within a signature file included in the signed JAR file is applied to a digest algorithm 6010 and digest 6011 for the signature file is computed. A digital signature is generated by applying the digest for the signature to a signature algorithm 6012. A private key 6013 of a content provider who provides the application is used for the signature algorithm. The generated digital signature is included in a signature block file to be provided in a JAR file format to a user via a recording medium or network.

Besides, the private key is a key, which is not opened to the public, of an asymmetric key pair, which is used for a public key cryptosystem, of one entity. In some cases, the private key may means a key used in a symmetric key cryptosystem. A key corresponding to the private key is called a public key. And, the public key means a key, which is opened to the public, of an asymmetric key pair, which is used for a public key cryptosystem, of one entity. Moreover, the public key is used in deciding authenticity of a signature in a signature system to be called a verification key as well.

Figure 9:
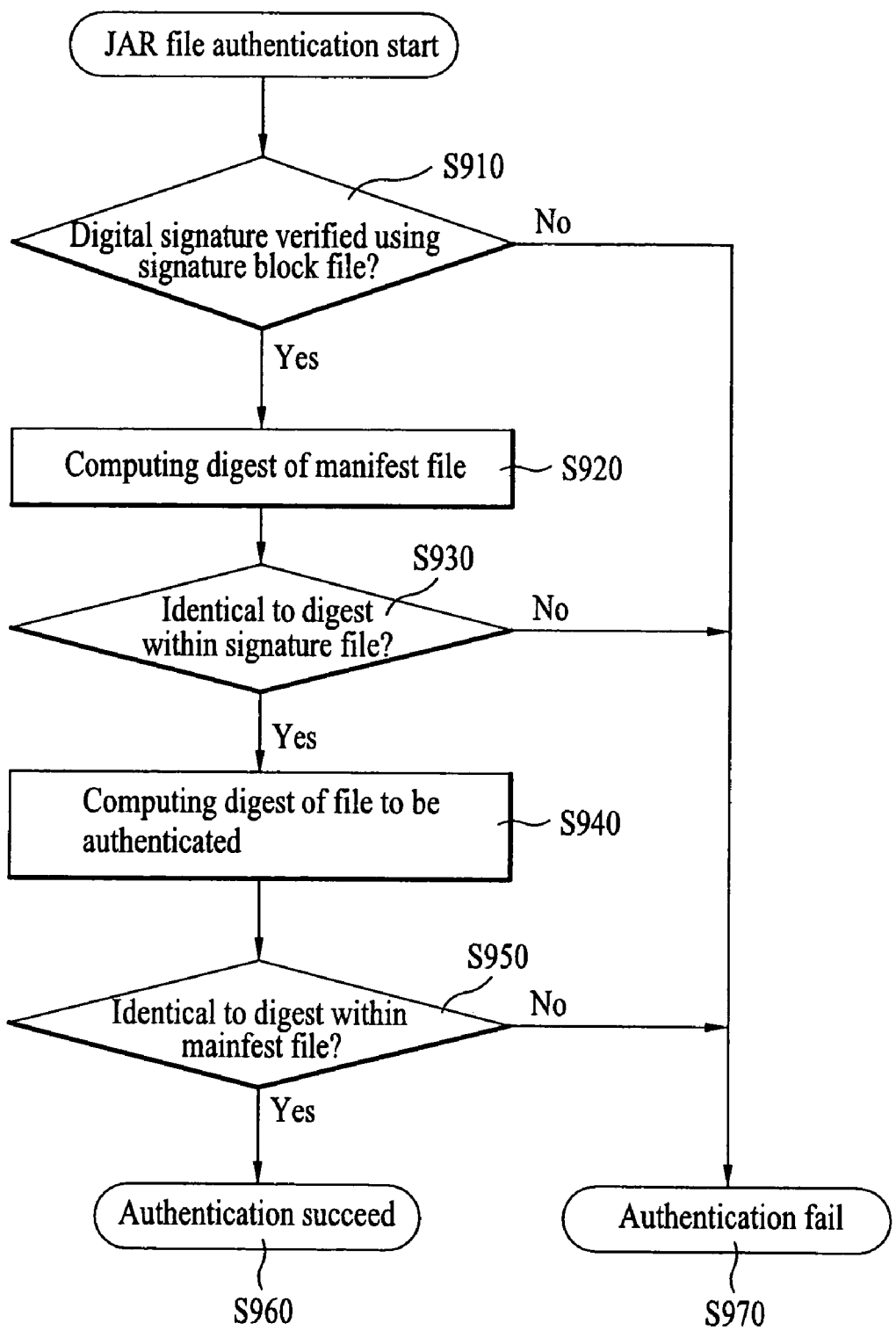
FIG. 9 is a flowchart of an authentication process of a file within a JAR file configuring a signed application according to one embodiment of the present invention.

FIG. 9 is a flowchart of an authentication process of a file within a JAR file configuring a signed application according to one embodiment of the present invention.

Referring to FIG. 9, a signature over a signature file is firstly verified when a manifest is firstly parsed (S910). A digital signature exists in a signature block file. In particular, the signature block file corresponding to the signature file is located and certificates are read out of the signature block file. And, a public key corresponding to a private key used for the generation of the signature file exists within a leaf certificate among the certificates.

An encrypted digital signature existing within the signature block file is restored to digest using the public key. The restored digest is then compared to digest of the signature file. If the compared digests are identical to each other, a verification of the digital signature is executed. If the verification of the digital signature fails, an authentication of the file fails (S970). And, the public key is a key corresponding to a private key used for a generation of the digital signature.

To check a validity of a file to be authenticated, digest for a manifest file is computed (S920). The computed digest is then compared to the digest existing within the signature file (S930). If the two compared digests are different from each other, the authentication of the file fails (S970). If the two compared digests are identical to each other, integrity for the manifest file is confirmed.

Digest for actual data of the file to be authenticated is computed (S940). The computed digest is compared to the digest within the manifest file (S950). If the compared digests are identical to each other, the validity of the file is confirmed so that the file succeeds in the authentication (S960). Yet, if the compared digests are different from to each other, the file fails in the authentication (S970).

In authenticating a file within a file configuring an application, the present invention is characterized in that integrity of a manifest file is checked using a signature file and in that a digital signature is verified using a signature block file. And, the present invention is characterized in that integrity for actual data of a JAR file is checked using the manifest file.

Hence, the integrity check for the actual data of the JAR file (S940, S950), the integrity check of the manifest file (S920, S930) and the verification of the digital signature (S910) can be individually implemented. Namely, the above-explained sequence of authentication flow of the embodiment shown in FIG. 9 is not mandatory but can be changed according to a playback system.

Besides, in authenticating the application, it is able to confirm whether the file to be authenticated is listed on the manifest file before the digest for the actual data of the file to be authenticated is computed.

Moreover, the verification result (S910) of the digital signature and the result (S930) of the integrity check for the manifest file can be stored for a later use. In this case, the steps S910 to S930 will be executed once in an authentication process of one JAR file.

Regarding the verification of the digital signature, a certificate used for the verification of the digital signature exists on certificates field within the signature block file. The certificates field includes at least one or more certificate chains. In verifying a digital signature of a signature block file using a public key within a leaf certificate, each of the certificate chains should be verified as well. The verification of the certificate chain is performed to a root certificate. If the verification of the root certificate and the verification of intermediate certificates reaching the root certificate are satisfactory, the authentication of the file to be authenticated can be accomplished.

Besides, the certificates of the certificate chain are recorded in a recording medium to be provided to a user or can downloaded to a user from outside of the recording medium. The certificate can include a version, a serial number, a signature algorithm, an issuer, an expiry date, an authentication subject, a public key, etc.

Figure 10:
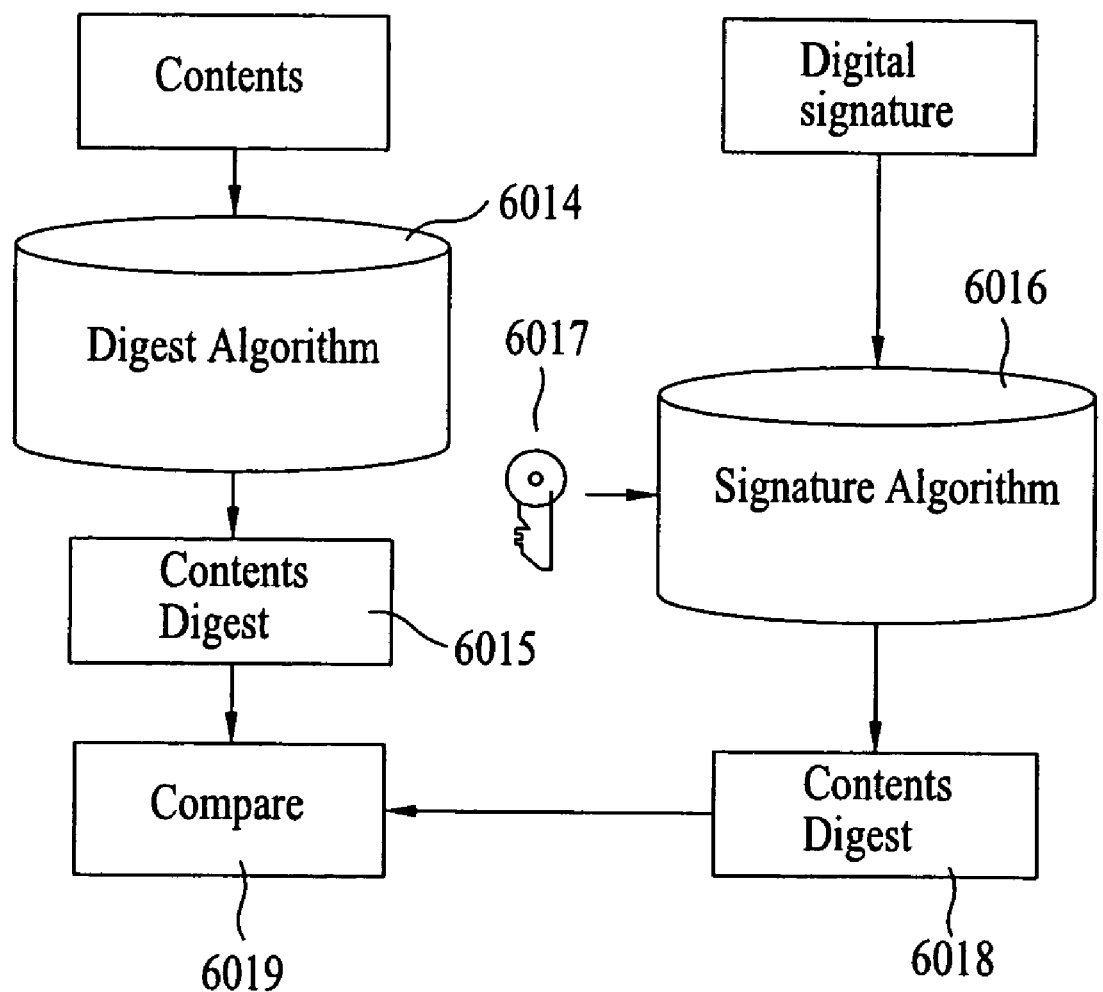
FIG. 10 is a diagram of a process of verifying a digital signature in an authentication process of a file within a JAR file according to one embodiment of the present invention.

FIG. 10 is a diagram of a process of verifying a digital signature according to one embodiment of the present invention, which is provided to help understanding of a method of verifying a digital signature in an authentication process of a file within a JAR file.

Referring to FIG. 10, a digital signature can be restored to a digest 6018 through a signature algorithm 6016 using a public key 6017 corresponding to a private key 6013 used for the digital signature. In the digital signature, due to the encryption algorithm characteristics, information encrypted with the private key 6013 should be restored using the public key 1017 corresponding to the private key 6013. Namely, in case that the public key 6017 corresponding to the private key 6013 used for the generation of the digital signature does not exist, the digital signature cannot be restored to the digest 6018. In this case, it cannot be authenticated that a provided application is provided by a legitimate content provider. The public key 6017 is included within a certificate. And, the certificate is stored within a signature block file to be provided to a user.

A playback system 17 computes digest 6015 by applying a signature file of a JAR file to be authenticated to a digest algorithm 6014. The digest algorithm is the digest algorithm used for the generation of the digital signature. The computed digest 6015 is compared to the digest 6018 generated from restoring the digital signature (6019). If the compared digests are not identical to each other, a verification of the digital signature fails.

Moreover, in case that certificates of a certificate chain certifying integrity of the public key 6017 fail in verifications, the verification of the digital signature fails as well. Since it is unable to decide that the application is signed by an authentic content provider, the authentication of the application cannot be achieved.

Figure 11:
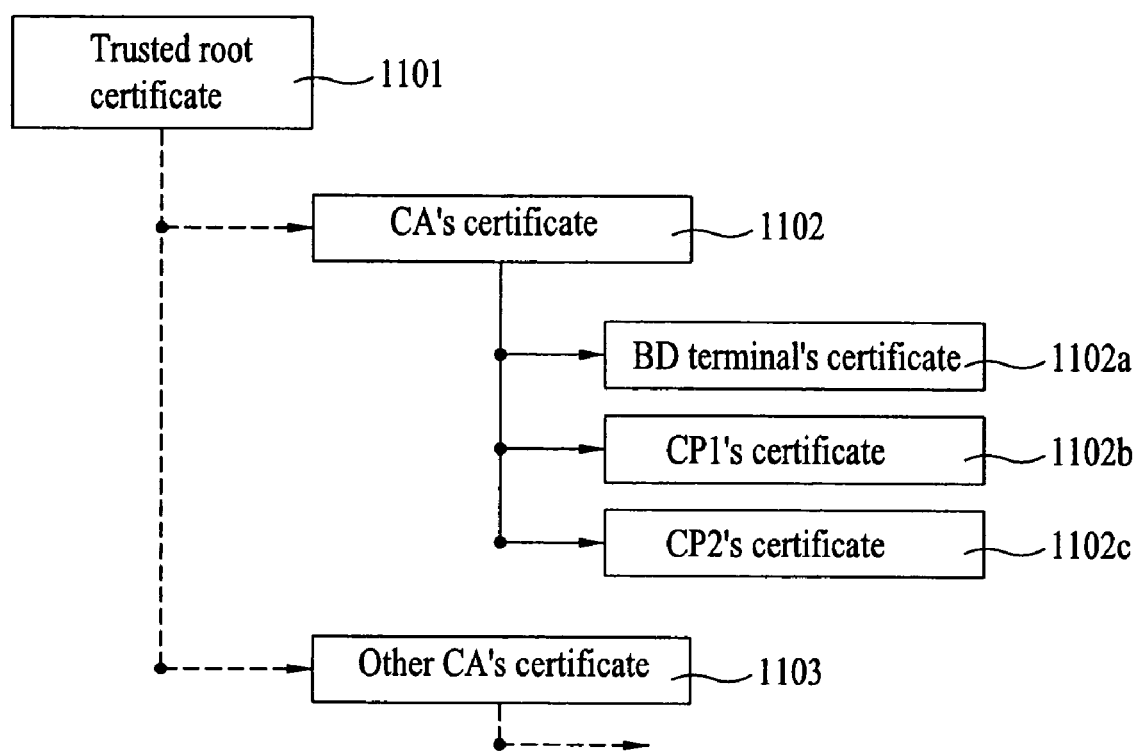
FIG. 11 is a diagram of a certificate chain used for authentication of a JAR file according to the present invention.

FIG. 11 is a diagram of a certificate chain used for authentication of a JAR file according to the present invention.

Referring to FIG. 11, a trusted root certificate authority can certify certificate authorities (1102, 1103). The certificate authority to be authenticated can be an AACS (advanced access content system) or a CPS (content protection system). In some cases, the AACS or CPS can become a root certificate authority by itself.

The AACS, CPS or other certificate authority can certify lower structures such as an optical recording/reproducing device, a content provider and the like independently (1102a, 1102b, 1102c). Such a structure is called a certificate chain.

In the certificate chain, a higher certificate authority, which can certify the trusted certificate root authority (CA) does not exist. In this case, the trusted certificate authority certifies itself (1101), which corresponds to a root certification (1101).

Each of the certificate authorities provides a certificate including a digital structure of each of the certificate authorities for a result of certification of itself or its lower structures. A certificate provided by a lowest certificate authority of the certificate chain can be called a leaf certificate, and a certificate provided by a highest certificate authority of the certificate chain can be called a root certificate. As mentioned in the foregoing description of FIG. 10, the certificates can secure the integrity of the public key that restores the digital signature in the verification process of the digital signature.

In some cases, each of the certificate authorities can make a certificate revocation list (CRL). In this case, a content provider and user receives a downloaded the certificate revocation list, and then checks whether a certificate to be used for authentication is revoked before performing the authentication via the certificate. If the certificate is revoked, the authentication is not achieved. If the certificate is not revoked, the authentication is achieved on condition that other authentication requirements are met.

Besides, a trusted root certificate provided by a trusted certificate authority is stored in a specific area of a recording medium in a file format or the like to be provided to a user or can be downloaded from outside of a recording medium to be stored in a key store of an optical recording/reproducing device.

While an application is being authenticated, an optical recording/reproducing device checks whether a root certificate within a signature block file is identical to a trusted root certificate stored within the recording medium or key store. If the two certificates are not identical to each other, the application is not loaded in "Java VM". Even if the application is loaded in "Java VM", the application is preferably not executed.

Figure 12:
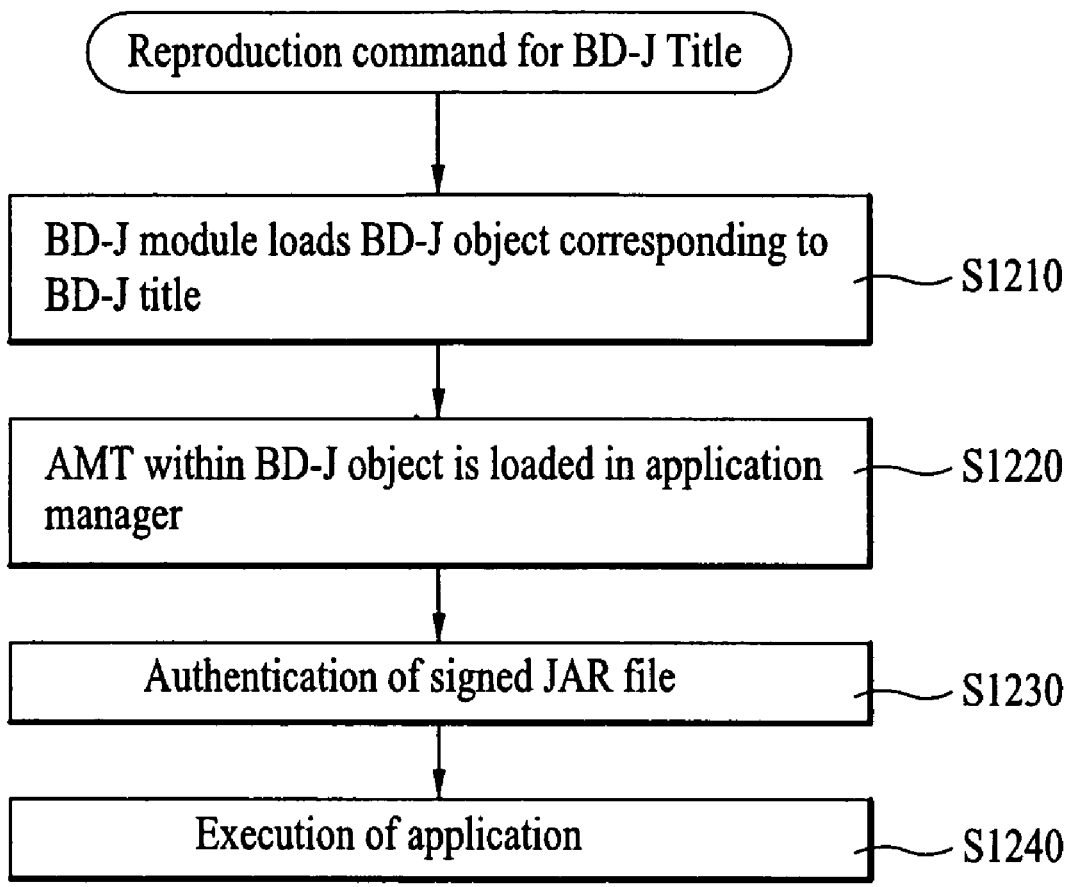
FIG. 12 is a flowchart of a method of reproducing a title according to the present invention.

FIG. 12 is a flowchart of a method of reproducing a title according to the present invention.

Referring to FIG. 12, first of all, BD-J title is taken as an example for explanation. For BD-J title to be reproduced, "BD-J Module" loads BD-J Object corresponding to the BD-J title (S1210). The BD-J Object includes management information associated with the BD-J Title. "AMT", i.e., "Application Management Table" among the management information is loaded in "Application Manager" (S1220). The management information includes "AppCacheInfo". The "AppCacheInfo" is provided to "Application Cache Manager" within "BD-J Module" to decide what kind of file is transferred to "Application Cache" from a virtual package.

Classes configuring an application associated with the reproduction of the BD-J title are loaded from JAR files of the virtual package. The JAR files of the virtual package can exist in a recording medium or in a local storage. In case that the JAR file exists in the local storage, the JAR file may exist in an application data area within the local storage. In this case, the application data area is an area where data configuring an application is stored.

The present invention is characterized in authenticating an application during a class loading. An authentication of the application shall be performed by "Java VM". The authentication of the application is achieved in a manner of performing authentication on the JAR files configuring the application (S1230).

An authentication of a signed JAR file comprises checking integrity of a manifest file using a signature file and verifying a digital signature using a signature block file. Integrity of actual data of the signed JAR file can be confirmed by the manifest file for the JAR file.

In case that the digital signature is verified according to the present invention and if the integrity of the actual data within the JAR file and the manifest file is confirmed according to the present invention, the authentication of the application succeeded.

In case that authentication is succeeded according to the present invention, the application(s) is executed by "Java VM" (S1240). The BD-J application accesses an actual resource of a playback system using "API (application programming interface)". And, resources of the playback system include a disc file system, media decoders, static content decoders, storage devices and network connections. Through the access to theses resources, the application can perform specific functions required for the reproduction of the BD-J Title. Through the execution of the application, data configuring the BD-J title within a recording medium and/or data within a local storage can be reproduced.

In case of a signed application, unless a digital signature is verified or unless integrity of actual data within a JAR file is confirmed, an authentication of the application is not achieved.

An unsigned application is configured with an unsigned JAR file. A signature file and a signature block file do not exist in the unsigned JAR file. Hence, it is unable to check integrity of a manifest file. Yet, on condition that the manifest file is valid, integrity for actual data within the unsigned JAR file may be checked. Hence, in case of the unsigned application, the authentication will not be achieved by the authentication of the application according to the present invention.

In case that authentication of application fails, it will be preferable that the application is not loaded in "Java VM" or not to be executed. Yet, this is a problem about implementation of an optical recording/reproducing device. Hence, an unauthenticated application can be executed within a limited range in "Java VM". This is called "Sandbox". An access of the unauthenticated application to resources of a playback system is restricted according to a security policy within the "sandbox". Hence, an application approved to access the resources of the playback system by the "Sandbox" is able to perform its jobs. Yet, an application prohibited from accessing the resources of the playback system by the "Sandbox" is unable to read or change files within the resources, thereby avoiding causing damage to the playback system.

In case of the unsigned application, it is difficult to identify a distributor of the application. Hence, it is preferable that the application is not executed for the protection of a playback system. This is because the playback system can be damaged by a malicious function caused by the application. Even if the unsigned application is executed, it is preferable that the unsigned application is executed within "Sandbox" approving an access to the restricted resources only.

In case of the signed application, it is preferable that an unauthenticated application is not executed or is executed within "Sandbox". Yet, in case of a signed application that is unauthenticated, it is able to decide a content provider having distributed the application through a digital signature of the application. Hence, if damage is caused to a playback system by a malicious function of the application, it is able to accuse the content provider of responsibility for the distribution of the application.

A data reproducing apparatus according to the present invention is explained with reference to FIG. 4 and FIG. 5.

First of all, a data reproducing apparatus using a local storage according to the present invention includes a controller 12 checking information for identifying an application associated with a title from an object file corresponding to the title to be reproduced, the controller 12 authenticating the associated application and a decoder reproducing the title according to an execution of the application. The decoder configures a playback system 17 in part. And, the application exists within a recording medium or local storage.

In the present invention, the controller 12 authenticates the application in a manner of authenticating a file while data of the file configuring the application is being loaded to Java virtual machine.

Besides, the authentication of the file configuring the application comprises a verification of a digital signature of an entity signing the application using a signature block file within the file.

The verification of the digital signature is performed using a public key within the signature block file. Preferably, the public key is a key corresponding to a private key used for a generation of the digital signature.

And, the authentication of the file configuring the application includes integrity check of a file included in the file using a signature file within the file.

The controller 12 can control application not to be executed in case that the application is unauthenticated. And, the controller 12 can control the unauthenticated application to be executed within a sandbox on Java virtual machine 174b.

Hence, a playback system can be protected against an unauthenticated application. And, by controlling an access of the unauthenticated application to contents, the present invention can protect the contents.

Accordingly, the present invention provides the following effects and/or advantages.

First of all, the present invention can protect contents provided by a content provider and a user's playback system. Hence, the content provider can provide contents safely and the user can reproduce the contents with security. Therefore, the present invention can provide more convenient functions.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. In reproducing a title configured with data recorded on at least one of a recording medium and a local storage, a method of reproducing data, comprising:
   executing an object linked to the title and having a list of applications associated with the title;
   authenticating an application indicated by the object;
   constructing a virtual package by combining at least one of data associated with the title on the recording medium and data associated with the title in the local storage by executing the application; and
   reproducing the virtual package.

2. The method of claim 1, wherein the authenticating an application includes using a certification file in the application.

3. The method of claim 2, wherein the certification file is a JAR file.

4. The method of claim 2, wherein the authenticating an application includes verifying a digital signature of an entity signing the application by using a signature block file in the application.

5. The method of claim 2, wherein the authenticating an application includes checking integrity of actual data of the application using a manifest file including a digest for the actual data of the application.

6. The method of claim 5, wherein the authenticating an application further includes checking integrity for the manifest file using a signature file including a digest for the manifest file in the application.

7. The method of claim 1, wherein in case that the authenticating fails, the application is not executed.

8. The method of claim 1, wherein in case the authenticating fails, the application is executed within a sandbox on Java virtual machine.

9. A recording medium, comprising:
   a data area including a title configured with content data; and
   a management area including an object linked to the title and having a list of applications associated with the title wherein
    an application is authenticated through authentication of a certification file in the application,
    the application constructs a virtual package by combining at least one of data associated with the title on the recording medium and data associated with the title in a local storage, and
    the application reproduces the virtual package.

10. The recording medium of claim 9, wherein the certification file is a JAR file.

11. The recording medium of claim 9, wherein the application is authenticated by verifying a digital signature of an entity signing the application by using a signature block file in the application.

12. The recording medium of claim 9, wherein the application is authenticated by checking integrity of actual data of the application using a manifest file including a digest for the actual data in the application.

13. The recording medium of claim 12, wherein the application is authenticated by checking integrity of the manifest file using a signature file including a digest for the manifest file in the application.

14. In reproducing a title configured with data recorded on at least one of a recording medium and a local storage, an apparatus for reproducing data, comprising:
    a controller configured to
        execute an object linked to the title and having a list of applications associated with the title,
        authenticate an application indicated by the object,
        construct a virtual package by combining at least one of data associated with the title on the recording medium and data associated with the title in the local storage according to an execution of the application, and
        reproduce the virtual package.

15. The apparatus of claim 14, wherein the controller authenticates the application while the application is being loaded to a Java virtual machine.

16. The apparatus of claim 14, wherein the controller verifies a digital signature of an entity signing the file using a signature block file in the application.

17. The apparatus of claim 14, wherein the controller checks integrity for an actual data of the application by using a manifest file including a digest for the actual data in the application.

18. The apparatus of claim 14, wherein in case that an authenticating fails, the controller controls the application not to be executed.

19. The apparatus of claim 14, wherein in case that an authenticating fails, the controller controls the application to be executed within a sandbox on Java virtual machine.

20. The apparatus of claim 17, wherein the controller checks integrity for the manifest file by using a signature file including a digest for the manifest file in the application.

* * * * *